Jan. 4, 1927.
H. D. O'NEAL ET AL
HEAT PRODUCING COMPOSITION
Filed May 26, 1925
1,613,120
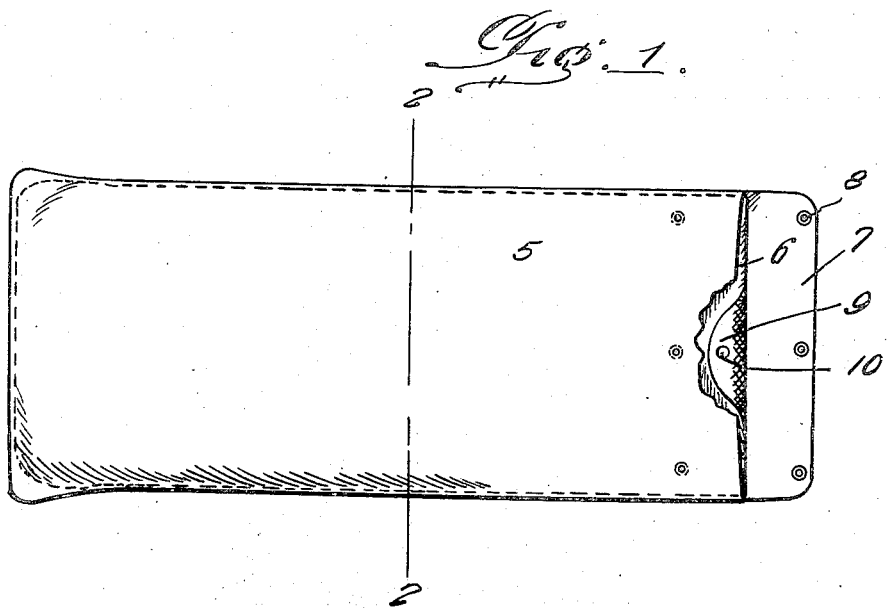
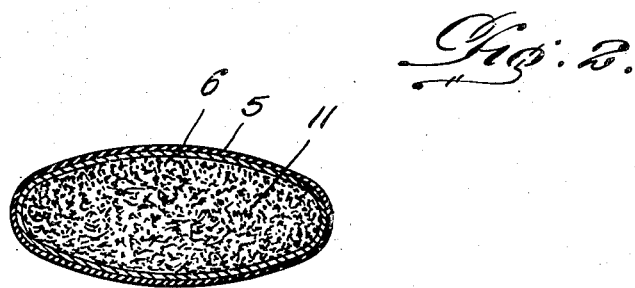

Patented Jan. 4, 1927.

1,613,120

UNITED STATES PATENT OFFICE.

HUGH D. O'NEAL AND JOHN LA PRAIM, OF CENTRAL, NEW MEXICO.

HEAT-PRODUCING COMPOSITION.

Application filed May 26, 1925. Serial No. 32,991.

The present invention appertains to a heat producing composition to be placed in a flexible bag so as to form a hot pack, which can be used in place of a hot water bottle or electric pad.

An important object of the invention is to provide a hot pack of this nature which is exceedingly simple, one which is efficient for relieving pain from the body, for keeping parts of the body warm, and treating parts of the body by providing elements which will develop heat for long periods of time, and which will maintain a constant heat for long periods of time, and to provide a composition which can be furnished at small cost, and which can be renewed at small cost.

Other objects of the invention are to provide a composition which has no poisonous ingredients, is odorless, will not corrode the container, will generate heat for at least fifteen hours continuously, will not emit any gas or injurious fumes and which is otherwise well adapted to the purpose for which it is designed.

Further objects and advantages of the invention will be in part obvious, and in part specifically pointed out in the description hereinafter contained, which, taken in connection with the accompanying drawings, discloses a certain preferred embodiment thereof. This embodiment, however, is to be considered as merely illustrative of its principle.

In the drawing:—

Figure 1 is an elevation of the container, and

Figure 2 is a transverse section therethrough taken substantially on the line 2—2 of Figure 1.

The heat producing ingredients are carried by a container such as is illustrated by way of example in the drawing. This container may be of any desired formation, configuration, materials, etc. However, the example which we have illustrated has proved satisfactory and consists of an outer bag 5 of rubber, and an inner bag 6 of canvas, the former of which has a flap closure 7 with suitable snap fasteners 8, and the latter of which has a flap closure 9 with a snap fastener 10. The heat producing ingredients are indicated by the numeral 11 in Figure 2, and are contained within the inner bag 6.

The heat producing ingredients used are potassium chlorate, a chloride, and iron (Fe). The chloride used is preferably cupric-chloride. Four parts of the chloride are used to one part of the potassium chlorate. All of the above ingredients are mixed thoroughly together, and then the composition formed is thoroughly mixed with iron millings. About one and one-half pounds iron millings are mixed with one ounce of the compositon above outlined in detail. To this mixture about one and one-half ounces of water is mixed, and thoroughly shaken in the canvas container.

Small quantities of traces of nitrates, sulphates, calcium, magnesium and heavy metal compounds, if present do no harm. Stated otherwise, the chemicals do not have to be in a chemically pure state.

Thus I may use 1 ounce of $KClO_3$ with 4 ounces of $CuCl_2$ and 120 ounces of iron millings. This quantity of material should be moistened with 7.5 ounces of water, and put into the bag as above described.

With the amount of the material mentioned above, it has been found from actual practice that the composition will generate heat for at least fifteen hours continuously. The chemical action taking place does not emit any injurious fumes, and the iron used in the hot pad is not a powdered iron but a coarser material, known as iron millings.

While a certain specific embodiment of our invention has been disclosed it will be obvious that many changes may be made therein without departing from its principle as defined, and claimed below.

It is of course understood that any desired quantity of the chlorate, chloride and iron millings can be used, to suit the occasion, and the mixture moistened with the proportionate amount of water.

The chlorate and chloride, and also the water, react with the iron to oxidize the latter, heat being liberated. Since the iron is in coarse fragments, the entire reaction requires a considerable time, so that the reaction heat is gradually liberated, making the heat last for a considerable time.

Having thus described the invention, what we claim as new and desire to secure by Letters Patent is:—

1. A heat producing composition adapted to have water applied thereto to set up a chemical action including potassium chlorate, cupric chloride and iron in a granular condition.

2. A heat producing composition adapted to have water applied thereto to set up a chemical action including four parts cupric chloride, about one part potassium chlorate, thoroughly mixed together and with about 120 parts of iron millings.

In testimony whereof we affix our signatures.

HUGH D. O'NEAL.
JOHN LA PRAIM.